US006314497B1

(12) United States Patent
Clohset et al.

(10) Patent No.: US 6,314,497 B1
(45) Date of Patent: Nov. 6, 2001

(54) APPARATUS AND METHOD FOR MAINTAINING CACHE COHERENCY IN A MEMORY SYSTEM

(75) Inventors: Steve J. Clohset, Sacremento; Narendra S. Khandekar; Zohar Bogin, both of Folsom, all of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/205,646

(22) Filed: Dec. 3, 1998

(51) Int. Cl.[7] ...................................................... G06F 12/12
(52) U.S. Cl. ............................. 711/141; 711/143; 711/154
(58) Field of Search ..................................... 710/126, 128; 711/154, 159, 143, 141

(56) References Cited

U.S. PATENT DOCUMENTS

| | | | | |
|---|---|---|---|---|
| 5,550,989 | * | 8/1996 | Santos ................................. | 710/126 |
| 5,557,769 | * | 9/1996 | Bailey et al. ........................ | 395/473 |
| 5,596,729 | * | 1/1997 | Lester et al. ........................ | 710/128 |
| 5,704,058 | * | 12/1997 | Derrick et al. ..................... | 395/495 |
| 5,761,725 | * | 6/1998 | Zeller et al. ........................ | 711/146 |
| 5,793,995 | * | 8/1998 | Riley et al. ......................... | 710/128 |

* cited by examiner

Primary Examiner—Reba I. Elmore
(74) Attorney, Agent, or Firm—Blakely, Sokoloff, Taylor & Zafman LLP

(57) ABSTRACT

According to one embodiment, a computer system is disclosed. The computer system includes a processor, a memory, an inverting device, a storage device coupled to the inverting device and a device coupled to the storage device. The device receives byte enable information and inverted information and provides inverted byte enable information to the memory upon a write back operation to the memory.

17 Claims, 4 Drawing Sheets

APPARATUS AND METHOD FOR MAINTAINING CACHE COHERENCY IN A MEMORY SYSTEM

BACKGROUND OF THE INVENTION

I. Field of the Invention

The present invention relates to the field of computer systems. More specifically, the present invention relates to memory access in computer systems.

II. Backaround Information

Relative to the speed of host processors, system dynamic random access memory (DRAM) memory is typically quite slow. Whenever the processor accesses DRAM, wait states are inserted in each bus cycle. This diminishes the performance of the processor in the system. To improve the performance of the processor, a relatively small amount of high-speed static RAM (cache) is positioned between the processor and DRAM memory. A device referred to as a cache controller attempts to keep copies of information that the processor may request in its cache. The cache controller maintains a directory to track information currently in the cache. Whenever the processor initiates a memory read, the cache controller performs a very quick search of the directory to determine if the requested information is already in the cache. When the requested information is in the cache, a "hit" occurs. When the requested information is not in the cache, a "miss" occurs.

When a hit occurs, the controller accesses the cache memory to get the requested information, routes it to the processor, and informs the processor of the presence of the data on the bus. Quick directory search and fast access time of the static RAM (cache) guarantees the processor fast access to the requested information. When a miss occurs, the memory controller accesses the DRAM to get the requested data. One or more wait states are inserted in the processor's bus cycle. Whenever the cache controller is forced to go to DRAM to get information, it always gets an object of a fixed size from memory. This is referred to as a "line" of information. The size of a line is defined by cache controller design. When the controller retrieves the line from DRAM memory, it supplies the line containing the originally requested data to the processor and also records the entire line in the external cache (if one is present). If the processor has an internal cache, as most processors do, the entire line is also supplied to the processor for storage in its internal cache.

A cache controller that resides between its associated processor and the rest of the world is referred to as a look-through cache controller. Look-through cache controllers are divided into two categories: write-through and write-back. A write-back cache controller handles memory write operations as follows: on a write hit, it updates the line in cache but not in DRAM. It then marks the line as dirty, or modified, in the cache directory. This means that the line no longer mirrors its associated line in DRAM memory. Of the two lines, the cache line is current and the memory line is stale.

On a write miss, the controller typically only updates the line in memory. If the contents of the cache mirrors the information in memory the cache is called as coherent or consistent. The write-back cache's handling of memory write hits allows the cache and the memory contents to become desynchronized or inconsistent.

Whenever the CPU or any other master in the system generates an access to shared memory, that access is snooped by other agents in the system. The term "snoop" means that the cache latches the line address and looks it up to determine if it has a copy of the line being accessed. If the access hits a modified line, the agent that owns the exclusive copy of that line initiates a write-back to main memory. The term "write-back" is used when the processor has a version in its cache, of whatever should be in the memory, and is in a modified state, which means that the memory in the processor is the most coherent. When a PCI bus master drives a write to memory, and it happens to hit the cache location, the processors needs to evict the most coherent memory such that it does not override the original write. In this case the write is the most coherent while the write-back inside the cache is less coherent.

Generally, a write-back operation is performed to the memory before the PCI write is performed to the DRAM. This policy allows the write operation to override the write back as the write operation is the most coherent piece of knowledge, since the write is the last thing that happens to the DRAM.

It is desirable to provide a way in which one may first write to the system memory and then write-back to the system memory without losing the most coherent information. This is because on a bus such as the P6 bus in a Pentium® Processor manufactured by Intel Corporation of Santa Clara, Calif., the write data is always transferred before the write back data. Sending write data to memory first may reduce delays in the pipeline.

SUMMARY OF THE INVENTION

The present invention provides an apparatus to control access to a memory. The apparatus includes an inverting device to invert byte enable information. The apparatus also includes a storage device, coupled to the inverting device, to store inverted byte enable information. The apparatus further includes a device, coupled to the storage device, to receive byte enable information and inverted byte enable information and to provide to the memory inverted byte enable information upon a write-back operation.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

The present invention provides an apparatus to control access to a memory. The apparatus includes an inverting device to invert byte enable information. The apparatus also includes a queue, coupled to the inverting device, to store inverted byte enable information. The apparatus further includes a selecting device to receive byte enable information and inverted byte information and to provide to the memory inverted byte enable information upon a write-back operation. The apparatus of the present invention provides a way by which one may first perform a write operation to a system memory and then a write-back without losing the most coherent information. Inverting the byte enable information allows a write-back operation to the memory, after the write operation, to byte locations that were not previously written to during the write operation.

Figure 1:
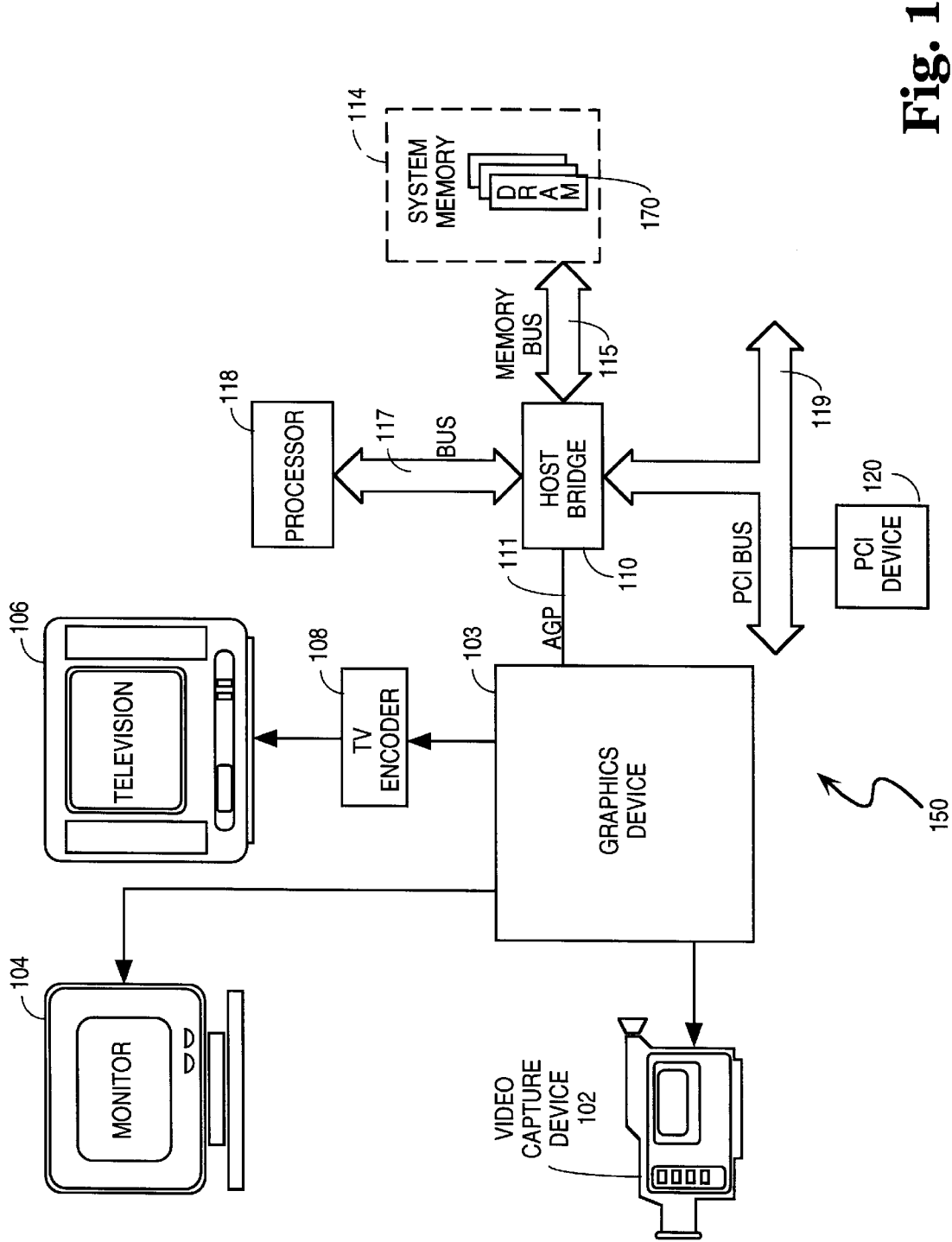
FIG. 1 illustrates an exemplary computer system including the apparatus for controlling access to memory according to one embodiment of the present invention described herein.

FIG. 1 illustrates an exemplary computer system 150 with a host bridge 110 that includes an apparatus to control access to memory (not shown) according to one embodiment of the present invention. The computer system includes a processor 118 coupled via bus 117 to host bridge 110. Host bridge 110 may include therein a memory controller that controls operation of system memory 114. System memory 114 includes one or more Dynamic Random Access Memory (DRAM) devices 170. In one embodiment according to the present invention the processor as referred herein may be an Intel Pentium® II processor, but the present invention is not limited in scope to such processor. Also, in one embodiment of the present invention, host bridge 110 may be a 440 Bx® chipset manufactured by Intel Corp. of Santa Clara, Calif.

Host bridge 110 is coupled to the system memory 114 via a memory bus 115. The host bridge is also coupled to a Peripheral Component Interconnect (PCI) bus 119. One or more PCI devices 120 are coupled to PCI bus 119. PCI device 120 maybe an input/output (I/O) hardware device coupled to the system such as, for example, a PCI expansion connector (not shown), or mounted to the personal computer (PC) motherboard (not shown). Examples of PCI devices include, but are not limited to, graphics controller(s)/card(s), disc controller(s)/card(s), local area network (LAN) controller(s)/card(s), and video controller cards. A graphics device 103 is coupled to host bridge 110 via an accelerated graphics port (AGP) 111. AGP 111 is a port on host bridge 110 which interfaces host bridge 110 to graphics device 103. The graphics device 103 accepts video data for display to a video display device such as a computer monitor 104 or a television (TV) monitor 106 through a TV encoder 108.

The PCI or AGP masters using PCI protocol can access any number of quad words in a cache (not shown). Whenever the CPU or any other master in the system generates an access to shared memory, the access is snooped by other agents such as the AGP in the system. If the access hits a modified line, the agent that owns the exclusive copy of that line initiates a write-back to system memory 114. The write-back is always initiated starting at the quad word that was accessed and the remaining quad words of the cache line are written back in X86 order. The following table illustrates the order in which the quad words are written back.

| Initial Quadword Transferred | Second Quadword Transferred | Third Quadword Transferred | Fourth Quadword Transferred |
| --- | --- | --- | --- |
| 0 | 1 | 2 | 3 |
| 1 | 0 | 3 | 2 |
| 2 | 3 | 0 | 1 |
| 3 | 2 | 1 | 0 |

Figure 2:
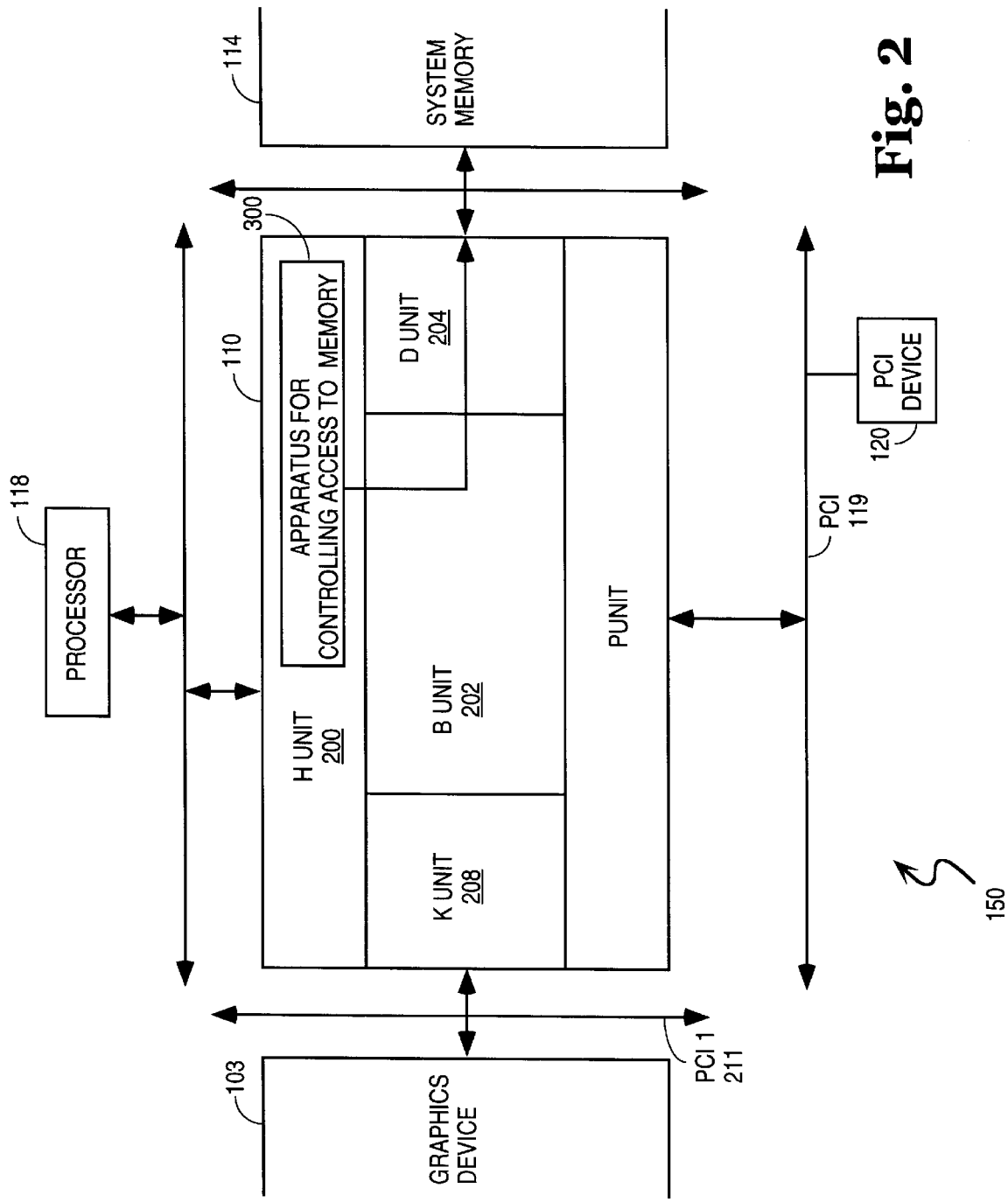
FIG. 2 illustrates an exemplary block diagram of a host bridge referred to in FIG. 1.

FIG. 2 illustrates an example of the computer system 150 of FIG. 1 where the host bridge 110 is shown in more detail. Host bridge 110 includes a host interface unit (H Unit) 200 which interfaces host bridge 110 with processor 118. Host bridge 110 also has a bridge interface unit (B Unit) 202 which controls the interaction between various units including the processor 118, the graphics device 103, the PCI 119 and the PCI devices 120, and the system memory 114. A DRAM interface unit (D Unit) 204 docks the host bridge 110 to the system memory 114. The D Unit includes a memory controller that, allows any device on any of the host bridge 110's interfaces to talk to system memory 114. These devices could be CPU graphics controllers, etc. A PCI interface unit (K Unit) 208 is coupled to graphics device 103.

When a host processor initiates a memory access a write-back cache and/or the host bridge may take the following actions. A L2 cache performs a directory search and updates its copy of the line on a write hit. The L2 cache line is marked "modified" to indicate that it no longer matches the memory. The line in memory is stale. On a cache miss, the write is performed to the target memory.

When a PCI master initiates a memory write the following action is taken by a write-back cache and/or the host bridge. The L2 cache snoops the write and also initiates an invalidation cycle on the host bus so the host processor's L1 cache can snoop the write as well. If it is a snoop hit on a clean line in the L2 cache, the L2 cache invalidates its copy. If it is a snoop hit on a modified line, the master is about to update one or more bytes within a stale line in memory. The cache (either L1 or L2, whichever has the latest copy) writes the modified line into memory and both L1 and L2 invalidate their cache copies.

Figure 3:
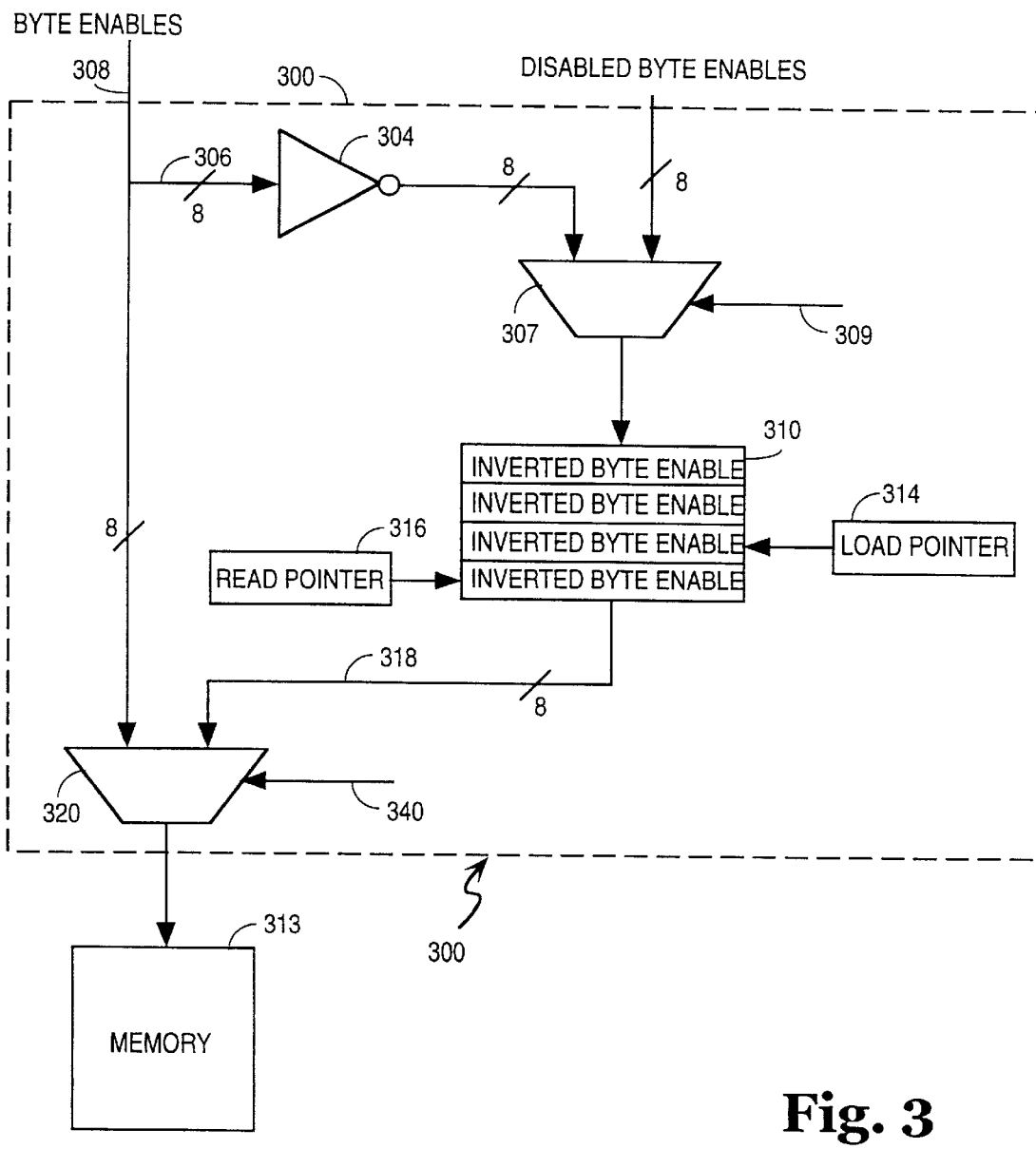
FIG. 3 illustrates a block diagram of the apparatus for performing accesses to the memory according to one embodiment of the present invention.

FIG. 3 illustrates a block diagram of an apparatus 300 for performing accesses to the memory according to one embodiment of the present invention. Apparatus 300 is coupled to a write data bus 308 that carries processor write data. Byte enable information, in the form of byte enable bytes (hereinafter referred to as "byte enables"), in connection with a write operation, are sent via bus 308 to apparatus 300 according to the present invention. The host bridge 110 of FIGS. 1 and 2 implements the apparatus 300 according to the present invention. Apparatus 300 inverts byte enables that were provided to memory 313 to enable the write operation. According to the Intel Pentium Pro® bus protocol, write data is received on the host bus before the write-back data.

To avoid that the write-back overrides the more coherent write data that was written to the DRAM, in the write cycle preceding the write-back cycle, the present invention implements apparatus 300 that utilizes the following byte enable scheme. The byte enables, besides being sent to the memory via bus 308 are also sent via 8-bit lines 306 to an inverting device 304. Inverting device 304 inverts the byte enable received. Inverted byte enables are provided to a first selecting device 307 by the inverting device 304. First selecting device 307 receives, at a first input thereof, inverted byte enable information and at a second input thereof, disabled byte enables. The disabled byte enable information is utilized where there is no valid information to be written to the memory. A control signal is provided by the H unit 200 (FIG. 2) via line 309 to a select port of the first selecting device 307. The first selecting device 307 is coupled at an output thereof to a storage device (byte enable queue) 310. The byte enable queue 310 has four byte enable entries. Each byte enable entry can accommodate 8-bits of data. A load pointer 314 points to a byte enable entry that is currently written with inverted byte enable information. After the inverted byte enable information is stored in queue 310, this information may be read out, byte-by-byte, in accordance with a read pointer 316 that points to one of the four entries of the queue 310. Inverted byte enable information may thus be retrieved and provided via line 318 to one of the inputs of a second selecting device 320.

The second selecting device 320 receives at one input thereof write byte enable information, via bus 308, at a second input thereof inverted write byte enable information via bus 318 and at a select port thereof a control signal via line 340 from the H unit. During a write operation to the memory, second selecting device 320 selects at an output thereof, and provides to the memory, the write byte enable information thereby enabling the bytes of memory 313 that are to be written during the write cycle.

When a write-back operation is performed, the second selecting device 320 selects from the second input thereof, the 20 inverted byte enable information and provides it to memory 313. In this way if during the write cycle an entire line was written to the memory, the inverted byte enable information precludes the writing of data to the same line in the memory during the write-back cycle, thereby preventing corruption of the previously written data. However, if not all the bytes of a line were written during the write cycle, then the inverted byte enable information enables writing, during the write-back operation, to the bytes that were not written during the previous write operation. In this way, write-back data may be written to DRAM after the written data was written to the DRAM, yet maintaining coherence.

Figure 4:
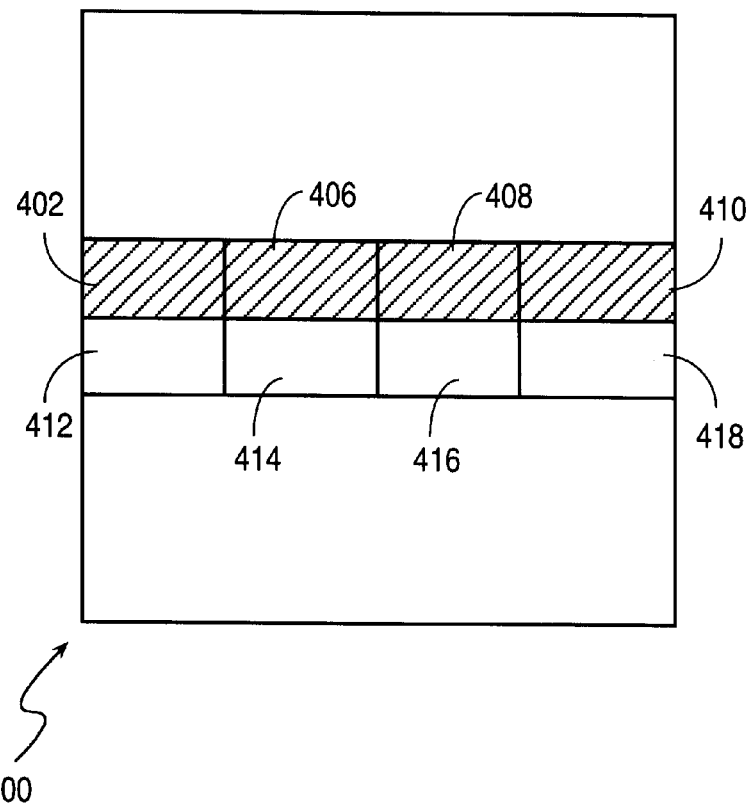
FIG. 4 illustrates a memory where a line of this memory is entirely written during a write cycle.

FIG. 4 illustrates a memory 400 where a line of this memory that includes bytes 402, 406, 408, and 410 have been written during the write operation. The written bytes are shown in hashed lines. In this case, the byte enable, corresponding to the bytes 402, 406, 408, and 410 are inverted during the write back operation. Therefore, one may not write back to bytes 402, 406, 408, and 410, but to the following bytes, 412, 414, 416, and 418.

Figure 5:
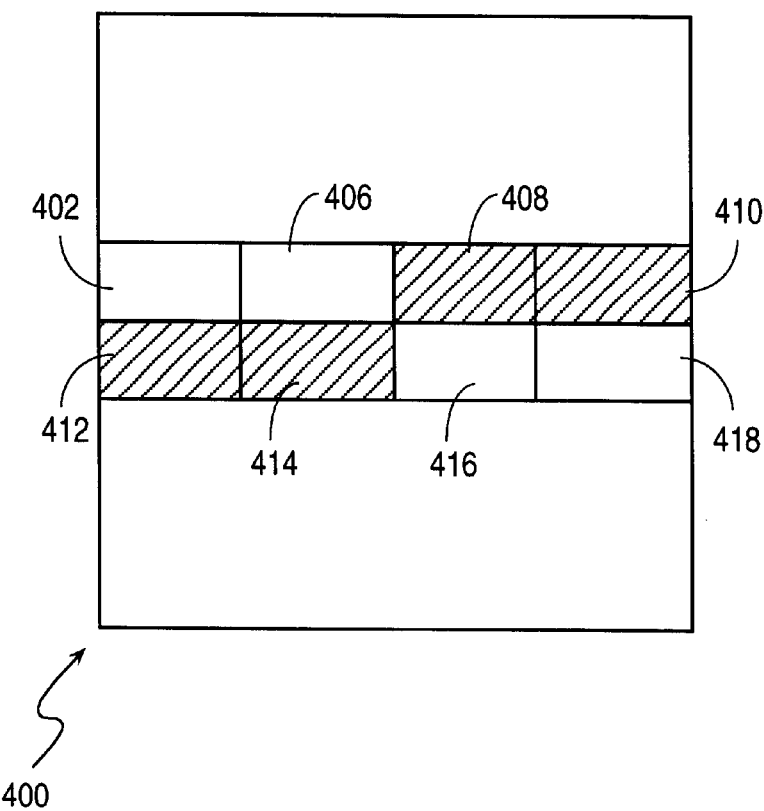
FIG. 5 illustrates a memory where only part of a line was written during the write cycle.

FIG. 5 illustrates a memory 400 where during the write operation bytes 408, 410, 412, and 414 were written during the write operation. The byte enable information for the line that includes bytes 412, 414, 416, and 418 is such that it permits writing into bytes 412 and 414, but not into bytes 416 and 418. However, when the byte enable information is inverted, during the write back cycle, bytes 412 and 414 will not be enabled while bytes 416 and 418 will be enabled, permitting therefore write back to bytes 416 and 418.

In the previous detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus to control access to a memory, the apparatus comprising:
    an inverting device to invert byte enable information, wherein said byte enable information is associated with a memory write operation;
    a storage device, coupled to said inverting device, to store inverted byte enable information; and
    a device, coupled to the storage device, to receive byte enable information and inverted byte enable information and to provide inverted byte enable information to the memory upon a write back operation to the memory.

2. The apparatus of claim 1, said device to receive byte enable and inverted byte enable information provides to the memory byte enable information upon a write operation to the memory.

3. The apparatus of claim 1, said device to receive byte enable information and inverted byte enable information includes a first selecting device.

4. The apparatus of claim 3 further including a second selecting device coupled to said inverting device, to select inverted byte enable information and to provide that information to said storage device.

5. The apparatus of claim 1, wherein a write operation to the memory is performed before write back operation to the memory.

6. The apparatus of claim 1 further including a read pointer to point to an entry of said storage device when inverted byte enable information stored in said entry is read out.

7. The apparatus of claim 1 further including a load pointer to point to a location in said storage device where an inverted byte of said inverted byte enable information is loaded.

8. A method comprising:
    receiving byte enable information at an apparatus for controlling access to a memory;
    inverting said byte enable information, wherein said byte enable information is associated with a memory write operation;
    storing inverted byte enable information; and
    providing said inverted byte enable information to said memory when a write-back operation is performed.

9. The method of claim 8 wherein, said byte enable information is provided to said memory when a write operation is performed.

10. The method of claim 8 wherein, providing said inverted information to said memory includes
    providing byte enable information and inverted byte enable to a selecting device; and
    providing by said selecting device said inverted byte enable information to said memory if a write-back operation is performed.

11. A computer system comprising:
    a processor;
    a memory; and
    an apparatus to control access to said memory coupled to said processor and to said memory, said apparatus including,
    an inverting device to invert byte enable information, wherein said byte enable information is associated with a memory write operation;
    a storage device, coupled to said inverting device, to store inverted byte enable information, and a device coupled to the storage device, to receive byte enable information and inverted byte enable information and to provide inverted byte enable information to the memory upon a write back operation to the memory.

12. The computer system of claim 11, said device to receive byte enable and inverted byte enable information provides to the memory byte enable information upon a write operation to the memory.

13. The computer system of claim 11, said device to receive byte enable information and inverted byte enable information includes a first selecting device.

14. The computer system of claim 13 further including a second selecting device coupled to said inverting device, to select inverted byte enable information and to provide that information to a memory.

15. The computer system of claim 11 wherein a write operation to the memory is performed before a write back operation to the memory.

16. The computer system of claim 11 further including a read pointer to point to an entry of said storage device when inverted byte enable information stored in said entry is read out.

17. The computer system of claim 11 further including a load pointer to point to a location in said storage device where an inverted byte of said byte enable information is loaded.

* * * * *

UNITED STATES PATENT AND TRADEMARK OFFICE
CERTIFICATE OF CORRECTION

PATENT NO. : 6,314,497 B1
DATED : November 6, 2001
INVENTOR(S) : Clohset et al.

It is certified that error appears in the above-identified patent and that said Letters Patent is hereby corrected as shown below:

<u>Title page,</u>
Item [75], delete "Sacremento" and insert -- Sacramento --.

<u>Column 5,</u>
Line 31, delete "the 20 inverted byte" and insert -- the inverted byte --.

Signed and Sealed this

Twenty-fifth Day of June, 2002

Attest:

Attesting Officer

JAMES E. ROGAN
*Director of the United States Patent and Trademark Office*